(12) United States Patent
Herzog

(10) Patent No.: US 10,603,847 B2
(45) Date of Patent: Mar. 31, 2020

(54) DEVICE FOR THE ADDITIVE MANUFACTURING OF THREE-DIMENSIONAL OBJECTS FROM POWDERY CONSTRUCTION MATERIAL

(71) Applicant: CL SCHUTZRECHTSVERWALTUNGS GMBH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 62 days.

(21) Appl. No.: 15/312,175

(22) PCT Filed: Apr. 23, 2015

(86) PCT No.: PCT/DE2015/100169
§ 371 (c)(1),
(2) Date: Nov. 17, 2016

(87) PCT Pub. No.: WO2015/176709
PCT Pub. Date: Nov. 26, 2015

(65) Prior Publication Data
US 2017/0087770 A1    Mar. 30, 2017

(30) Foreign Application Priority Data

May 21, 2014    (DE) .................. 10 2014 007 408

(51) Int. Cl.
*B29C 67/00*    (2017.01)
*B33Y 40/00*    (2020.01)
(Continued)

(52) U.S. Cl.
CPC ...... *B29C 67/0077* (2013.01); *B29C 35/0805* (2013.01); *B29C 64/153* (2017.08);
(Continued)

(58) Field of Classification Search
CPC ......... B33Y 30/00; B33Y 40/00; B33Y 50/02; B29C 64/20; B29C 64/386; B29C 64/393;
(Continued)

(56) References Cited

U.S. PATENT DOCUMENTS 7,621,733 B2    11/2009 Reynolds et al.
7,690,909 B2    4/2010 Wahlstrom
(Continued)

FOREIGN PATENT DOCUMENTS

DE    102007048385 B3    1/2009
DE    102007048385 B3    1/2009
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

A device for the additive manufacturing of three-dimensional objects from powdery construction material by introducing radiation energy, in particular a laser sintering and/or laser melting device, comprising at least one housing having a process chamber, in which process chamber a construction space or an exchangeable container having a vertically movable construction platform is arranged, to which construction platform the powdery construction material provided for solidification by radiation energy can be applied, characterized by a memory chip, which can be removed from the process chamber of the device with the exchangeable container and/or the constructed object and which can be read out by an electronic reading device and on which production data, which belong to the additive manufacturing process, and/or subsequent processing steps and/or processing stations for automatically controlling processing apparatuses and/or transport paths and/or storage positions and/or data from controlling active elements of the exchangeable container itself are stored.

19 Claims, 4 Drawing Sheets

(51) Int. Cl.
    *B29C 64/386*     (2017.01)
    *B29C 64/40*     (2017.01)
    *B29C 64/20*     (2017.01)
    *B29C 64/153*     (2017.01)
    *B33Y 30/00*     (2015.01)
    *B33Y 50/02*     (2015.01)
    *B29C 35/08*     (2006.01)
    *B29C 64/393*     (2017.01)

(52) U.S. Cl.
    CPC ............ *B29C 64/20* (2017.08); *B29C 64/386* (2017.08); *B29C 64/40* (2017.08); *B33Y 30/00* (2014.12); *B33Y 40/00* (2014.12); *B33Y 50/02* (2014.12); *B29C 64/393* (2017.08); *B29C 2035/0838* (2013.01)

(58) Field of Classification Search
    CPC ............ B29C 67/0077; B29C 67/0085; B29C 67/0088; B29C 67/0092; B29C 64/153
    USPC ...................... 425/135, 375, 174.4
    See application file for complete search history.

(56) References Cited

U.S. PATENT DOCUMENTS

| | | | |
|---|---|---|---|
| 2009/0173443 | A1* | 7/2009 | Kozlak ............... B29C 67/0088 156/303.1 |
| 2012/0119399 | A1* | 5/2012 | Fruth ................. B29C 67/0077 264/39 |
| 2013/0015596 | A1 | 1/2013 | Mozeika et al. |
| 2013/0052291 | A1 | 2/2013 | Morikawa |
| 2013/0075957 | A1 | 3/2013 | Swanson et al. |
| 2014/0178588 | A1* | 6/2014 | Swanson ............ B29C 67/0059 427/288 |

FOREIGN PATENT DOCUMENTS

| | | |
|---|---|---|
| DE | 60320588 T2 | 6/2009 |
| DE | 102009015130 A1 | 10/2010 |
| EP | 1769904 A2 | 4/2007 |
| EP | 1581902 B1 | 4/2008 |
| EP | 2537642 A1 | 12/2012 |
| EP | 1769903 B1 | 5/2014 |
| GB | 2472846 A | 2/2011 |
| JP | 2007/098951 A | 4/2007 |
| JP | 2013/006269 A | 1/2013 |
| WO | 03058506 A1 | 7/2003 |

* cited by examiner

DEVICE FOR THE ADDITIVE MANUFACTURING OF THREE-DIMENSIONAL OBJECTS FROM POWDERY CONSTRUCTION MATERIAL

CROSS-REFERENCE TO RELATED APPLICATIONS

This application is a United States national stage entry of an International Application serial no. PCT/DE2015/100169 filed Apr. 23, 2015 which claims priority to German Patent Application serial no. 10 2014 007 408.0 filed May 21, 2014. The contents of these applications are incorporated herein by reference in their entirety as if set forth verbatim.

The invention/innovation relates to a device for the additive manufacturing of three-dimensional objects from powdery building material by introducing radiation energy, with the further features of patent claim 1. Such devices are referred to in particular as laser sintering or laser melting machines and have a housing with a process chamber, in which a building space or an exchangeable container with a height-adjustable building platform is arranged.

During the building operation, a thin layer of powdery building material is applied to the building platform and subsequently solidified region by region in accordance with a prescribed structure of the component to be produced. This operation is continued by newly coating the previous powder layer or solidified partial layer each time until the three-dimensional component is completed in a layered manner of building under the effect of radiation.

In the case of such devices, it has already become known to use so-called exchangeable containers, which can be moved into a process chamber in order to carry out the building operation and, after completion of the building operation, can be removed again from the process chamber with the object located in it. These exchangeable containers are then brought into a so-called unpacking station or further processing station and the workpiece is further processed appropriately there.

Such a device is disclosed for example by DE 10 2009 036153 A1.

The invention addresses the problem of developing a device with the features of the preamble of claim 1 in such a way that, after the building operation, an assignment to a customer, an analysis and/or further transport and/or specific further processing of the workpiece can be performed at other stations on an automated, object-individualized basis.

This problem is solved according to the characterizing part of claim 1 by providing a memory chip, which can be removed with the exchangeable container and/or with the built object from the process chamber of the device, is assigned to the object, can be read by means of an electronic reading device and has stored on it manufacturing data belonging to the additive manufacturing process, subsequent processing steps and/or following processing stations and/or for automatically storing a building record and/or for controlling items of processing equipment, transporting paths and/or storage positions.

It is regarded as the essence of the invention to provide the object manufactured in the device with a memory chip, which is either integrated in the exchangeable container or detachably or undetachably fastened to it or else lies in the unsolidified building material within the building chamber, or even is connected to the object by an additive solidifying step or is arranged in a building platform or supporting structure. In this chip there may firstly be input by a writing device building data that are suitable for undoing the building operation that has been performed in the device, in the sense of "reverse engineering", in order to establish whether the object manufactured in the device could for example have internal structural faults and the like. Building data are for example the power of the laser, coating data, atmospheric data in the building chamber or the temperature, but in particular also molten pool temperatures or molten pool sizes in the region of the focal point of the laser on the powder layer, or other data that are suitable for providing information about a building operation that has already been carried out.

In addition, customer information may be stored in the same chip, for example a customer number, manufacturing data, delivery date and delivery location. Here, too, there are no limits to customer or delivery data.

It is also possible to use the chip for controlling subsequent processing steps, if the manufactured object is for example subjected to a special surface processing or is to be transported to an engraving device. Processing equipment following the manufacturing device, such as milling stations, thermal treatment stations, polishing stations, handling stations, an optical measuring station or else a disinfection station for the disinfecting treatment of the component and the like, may be automatically controlled by the chip.

The transporting path to such processing equipment that has to be covered between the actual manufacturing device and the processing devices may likewise be traveled specifically by the memory chip, so that manual intervention is not required during the transport of the object to further processing stations. In the end, it is also possible to store on the chip a position in a storage area that is then automatically moved to by a transporting device. If the chip is an RFID chip, when someone enters the storage space an inventory can be immediately compiled by an RFID reading device and it can be established which objects that have already been manufactured are where in the storage space and which objects are to be retrieved and delivered at a certain point in time.

Finally, it is also possible within the scope of the invention to use the memory chip for controlling active elements of the exchangeable container that is provided with the memory chip. In particular, drive motors for moving the exchangeable container, servomotors for the height adjustment of the building platform, heating elements, cooling elements, ventilating motors, suction extraction equipment and the like that are integrated in the exchangeable container can be controlled. Since the memory chip can be programmed individually for each building operation, the control of the active elements of the exchangeable container can be adapted precisely to the building process and subsequent treatment steps.

All of these data can be recorded on one and the same chip, it also being within the scope of the invention however to provide a plurality of readable memory chips that can be provided for the exchangeable container or the built project and can be removed with the latter from the process chamber of the device. The programming may be performed in the device itself, but it is also possible to provide preprogrammed chips, which are already fully or partially preprogrammed and for example are then just loaded with the manufacturing data.

The laser sintering or laser melting machine may be provided with an input device, for example a card reader or some other input device that is suitable for programming the memory chip more or less completely.

After the manufacturing operation, the exchangeable container is moved out of the device and can be brought on intended transporting paths to such other processing stations that are stored on the memory chip as an intermediate station or destination station. An intermediate station would be for example an intermediate processing station, a destination station would be a storage location.

In the laser sintering or laser melting device and in other processing stations, such as for example milling stations or thermal treatment stations, or else on sections of the route of the exchangeable container or of the object between the device and the other processing stations or storage sites, electronic reading devices that interact with the memory chip may be arranged, these being suitable for controlling diverting equipment, in order that the object or the exchangeable container is taken to the correct station.

In principle it is also possible to couple with the memory chip a processor that interacts with at least one sensor element inside the exchangeable container. As a result, physical data, such as pressure, temperature, time, acceleration values and the like, can be established, in order to record on the memory chip whether after the manufacturing operation the object was affected by any external circumstances that lead to the object being damaged. An acceleration sensor may for example detect a heavy collision, with the potential to lead to breakage or partial breakage of an object.

The invention/innovation is explained in more detail on the basis of advantageous exemplary embodiments in the figures of the drawing, in which.

Figure 1:
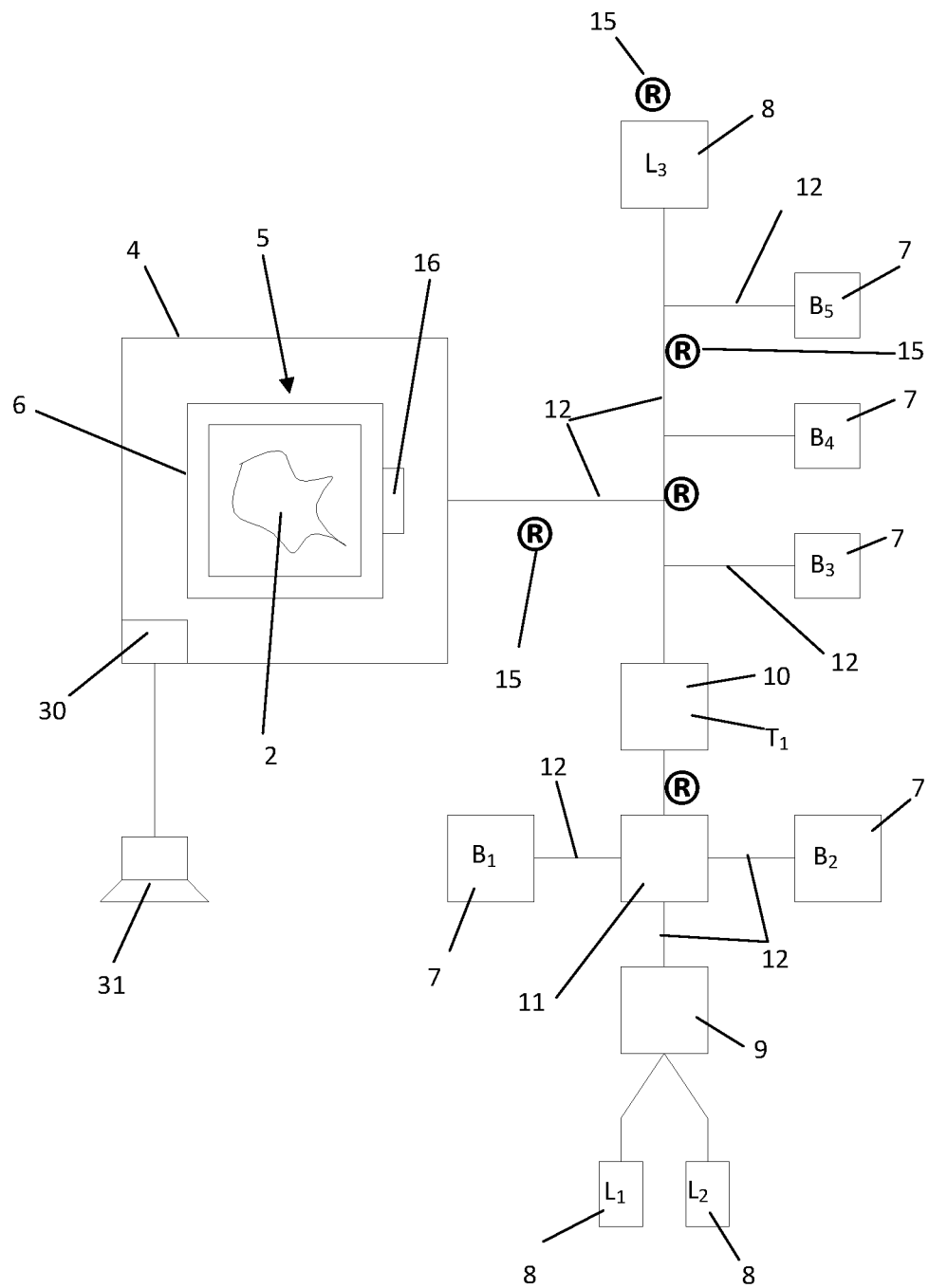
FIG. 1 shows a schematic representation of a device according to the invention with a plurality of transporting paths, processing stations and storage positions.

The device 1 represented in FIG. 1 serves for manufacturing three-dimensional objects 2 from powdery building material 3 by introducing radiation energy. It is in particular a laser sintering or laser melting device. Accommodated in a housing 4 is a process chamber 5, in which a building space or an exchangeable container 6 is arranged, with a height-adjustable building platform to which the powdery building material intended for solidifying by means of radiation energy can be applied.

It is also shown in FIG. 1 that, along with the actual manufacturing device, also provided are other processing stations 7, storage stations 8, at least one unpacking station 9, a testing station 10 and for example an engraving station 11, which are all connected to one another by means of transporting paths 12 in such a way that either the exchangeable container 6 or the object 2 freed from the powder bed can be transported to the various processing stations 7, storage locations 8 or other positions along the transporting paths 12. Automatically controlled transporting carriages, conveyor belts or other transporting mechanisms that are known as prior art and are suitable may be used for this.

In order to control the movements to the various transporting paths 12 or items of processing equipment or storage positions, either a memory chip 16 is provided, which can be removed with the exchangeable container 6 or with the built object 2 from the process chamber of the device 1, can be read by means of an electronic reading device 15 and has stored on it manufacturing data belonging to the additive manufacturing process and/or subsequent processing steps or the processing stations for automatically controlling processing equipment, transporting paths and/or storage positions.

The assignment between the exchangeable container 6 and the memory chip 16 may be performed in various ways.

In FIG. 1 it is shown that the memory chip 16 is attached to an outer wall of the exchangeable container 6.

Figure 2:
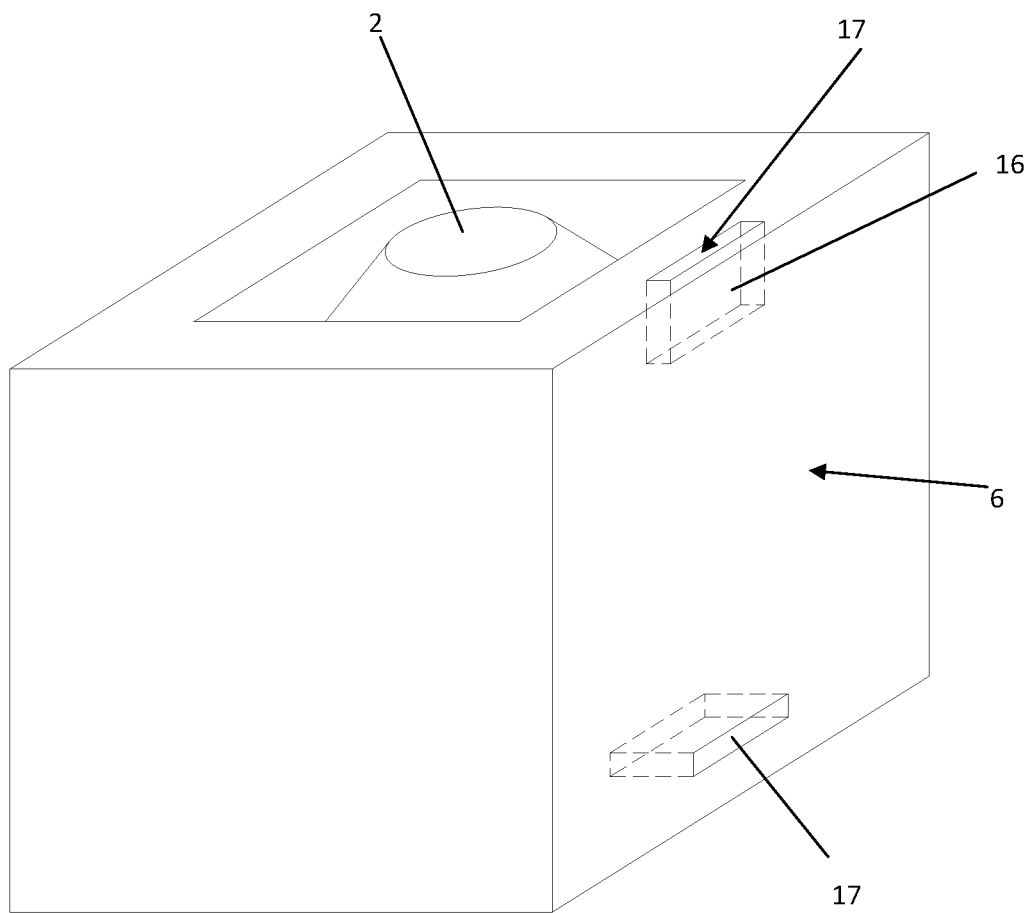
FIG. 2 shows a schematic view of an exchangeable container with two indicated positions of a readable memory chip.

In FIG. 2 it is indicated that the memory chip 16 can be inserted into pocket-like recesses 17 of the exchangeable container 6 and for example be locked there.

Figure 3:
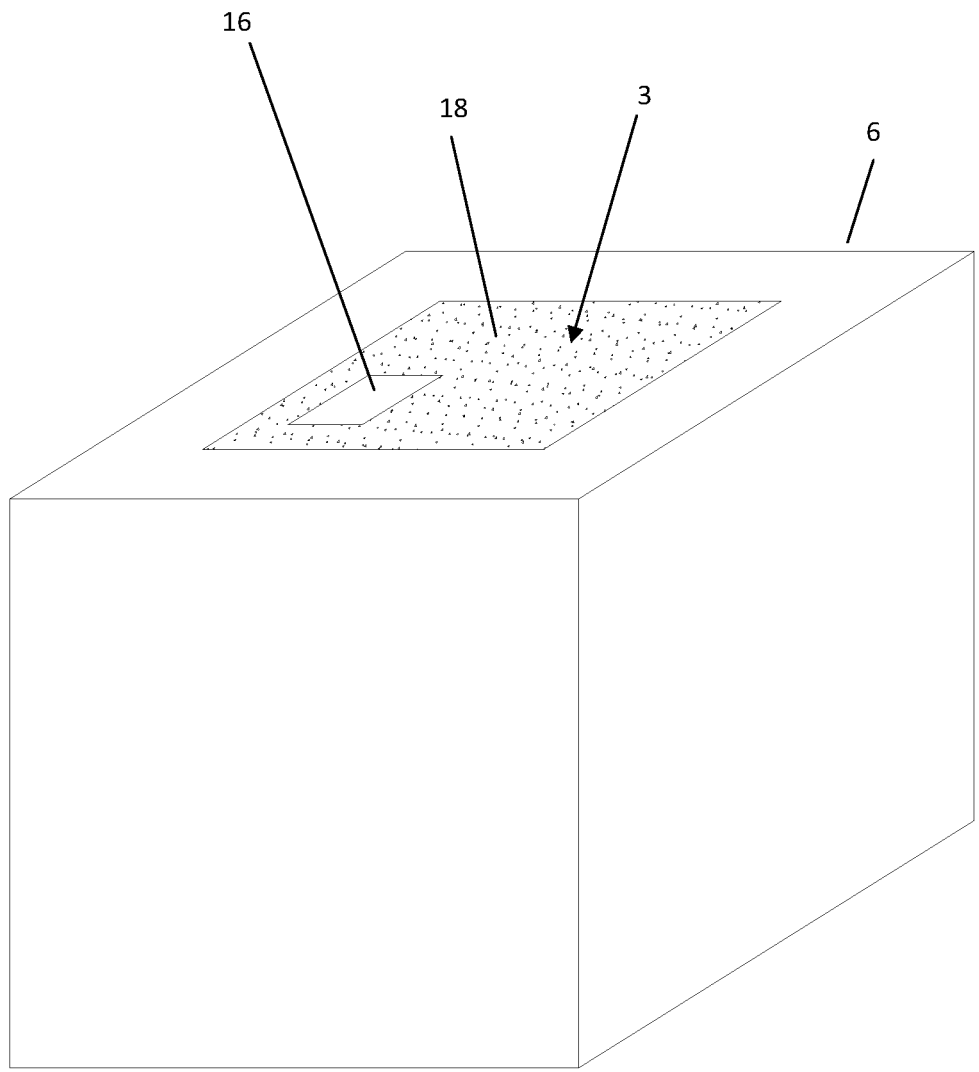
FIG. 3 shows a schematic representation of an exchangeable container with a memory chip incorporated in a powder bed.

In FIG. 3 it is shown that it is also adequate to place the memory chip 16 into the powder bed 18 of the building material 3 and leave it there, so that the memory chip 16 can be removed with the exchangeable container 6 from the process chamber. For temporarily fixing the memory chip 16, it may for example be introduced into a housing with anchoring projections that extend into the powder bed.

Figure 4:
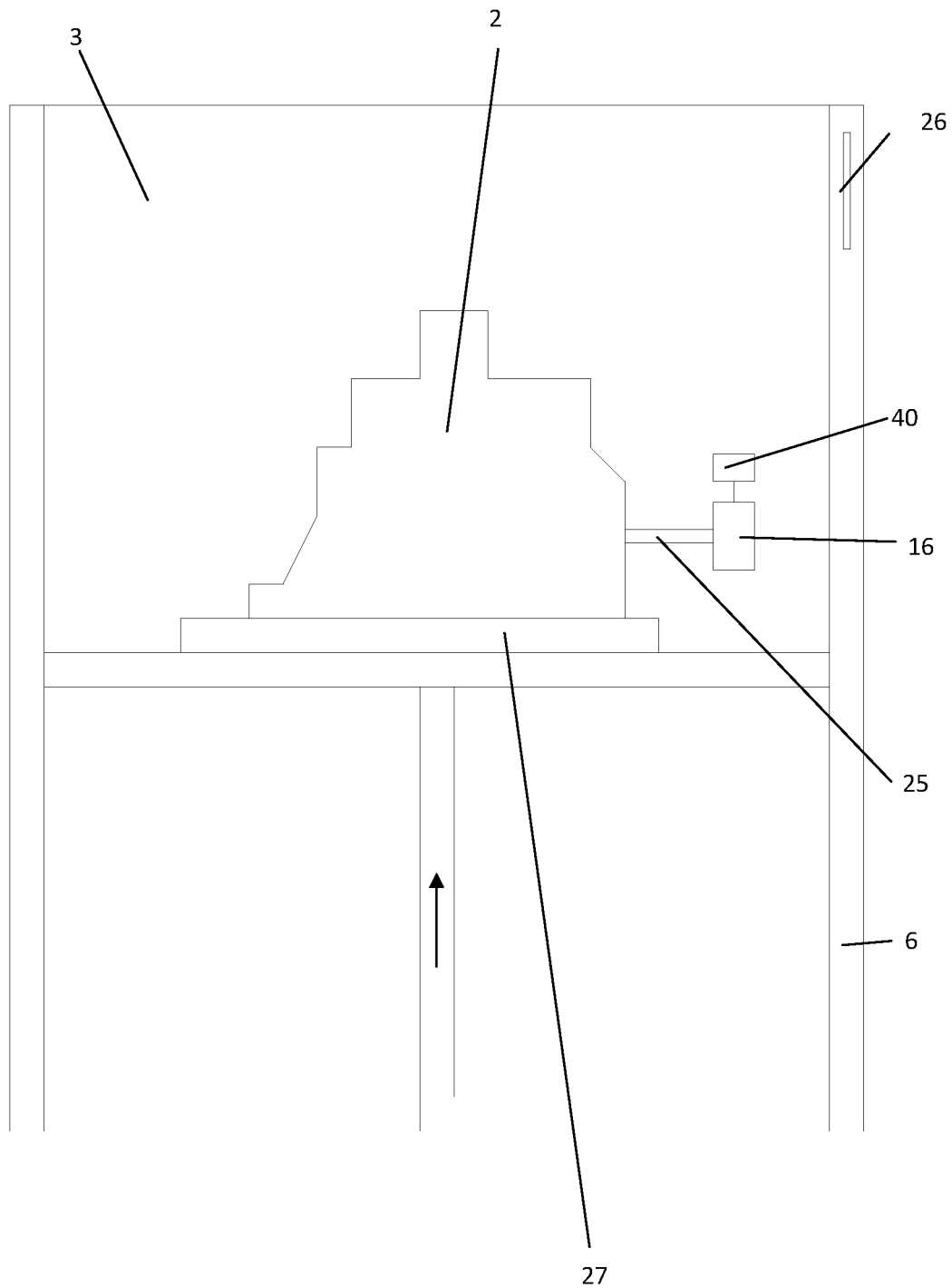
FIG. 4 shows a schematic sectional representation through a building chamber with an object built up therein, to which a memory chip is fastened by means of a connecting web.

Another possibility for the arrangement of the memory chip 16 is schematically represented in FIG. 4. There, the memory chip 16 is connected to the object 2 by means of a web 25, so that a fixed assignment between the memory chip 16 and the object 2 is retained even after unpacking the object from the building material 3. It is within the scope of the invention to provide along with the memory chip 16, which is connected to the object, one or more memory chips 26 in connection with the exchangeable container 6. The memory chips 26 may for example be used for influencing diverting equipment of the transporting paths 12; by contrast, the memory chip 16 on the object 2 contains customer data, process data, such as for example manufacturing temperatures, molten pool temperatures and the like. It is of course possible to record all data on both memory chips 16, 26 and read and use the data appropriately.

In FIG. 4 it is shown that the memory chip can also be accommodated in a building plate 27, onto which powdery building material 3 is deposited in layers during the building operation and solidified there, in order to build the first layers of the object 2.

In FIG. 1 it is also shown that in the process chamber 5 there may be provided a programming device 30, which is in connection with an input unit 31 in order to load appropriate data onto the memory chip 16.

It is also within the scope of the invention to connect to the memory chip 16 at least one processor 40, which interacts with at least one sensor element inside the exchangeable container 6, in order for example to register or report harmful accelerations, temperatures or other influences on the object 2.

LIST OF DESIGNATIONS

1 Device
2 Object
3 Building material
4 Housing
5 Process chamber
6 Exchangeable container
7 Processing station
8 Storage position
9 Unpacking station
10 Testing station
11 Engraving station
12 Transporting path 15 Reading device
16 Memory chip
25 Web
26 Memory chip
27 Building plate
30 Programming device
31 Input unit
40 Processor

The invention claimed is:

1. A system for additively manufacturing three-dimensional objects, the system comprising:
a laser sintering and/or laser melting device comprising a process chamber defined by at least one housing; and
an exchangeable container disposed within the process chamber, the exchangeable container comprising a memory chip that can be read by an electronic reading device, the memory chip comprising manufacturing data configured to automatically control, based at least in part on an object built or to be built using the laser sintering and/or laser melting device:
operation of one or more active elements of the exchangeable container; and/or
operation of one or more transporting paths, the one or more transporting paths configured to move the exchangeable container into or out of the process chamber and/or to or from one or more other processing stations and/or to or from one or more storage positions.

2. The system of claim 1, wherein:
the operation of the one or more active elements of the exchangeable container is performed in connection with:
an additive manufacturing process and/or one or more subsequent processing steps, and/or
one or more other processing stations associated with the additive manufacturing process and/or the one or more subsequent processing steps, and/or
movement of the exchangeable container along the one or more transporting paths; and/or
operation of one or more transporting paths is performed in connection with movement of the exchangeable container along the one or more transporting paths.

3. The system of claim 1, comprising:
a programming device for the memory chip.

4. The system of claim 1, wherein at least one of the one or more transporting paths is configured to move the exchangeable container to the one or more other processing stations.

5. The system of claim 1, wherein the memory chip is integrated within the exchangeable container or detachably or undetachably fastened to the exchangeable container, and/or disposed within a portion of unsolidified building material within the exchangeable container, and/or connected to or integrated within a building plate disposed within the exchangeable container.

6. The system of claim 1, comprising:
one or more electronic reading devices configured to interact with the memory chip, the one or more electronic reading devices being arranged:
on or in the device;
at or in the one or more other processing stations; and/or
on or at sections of the one or more transporting paths, the one or more transporting paths being disposed between the device and the one or more other processing stations.

7. The system of claim 1, comprising:
at least one sensor element disposed on or within the exchangeable container, wherein the memory chip is communicatively coupled to at least one processor configured to interact with the at least one sensor element.

8. The system of claim 1, comprising:
one or more diverting devices provided along the one or more transporting paths, the one or more diverting devices respectively configured to move the exchangeable container to a respective one of the one or more other processing stations along a respective one of the one or more transporting paths, the one or more diverting devices configured to be electronically controlled by the manufacturing data of the memory chip.

9. The system of claim 1, wherein the manufacturing data comprises:
a first processing sequence to be performed on the object within the process chamber and/or in connection with at least one of the one or more other processing stations; and/or
a second processing sequence to be performed on the object, the second processing sequence comprising a thermal treatment, a mechanical surface treatment, an optical measurement, surface irradiation treatment, an inscription treatment, a cooling treatment, and/or exposure to a cooling atmosphere.

10. The system of claim 1, wherein the one or more other processing stations comprise:
a thermal irradiating station, an inscription station, a laser surface processing station, a measuring station, a cooling station, and/or a removal station.

11. The system of claim 1, comprising:
the one or more transporting paths connecting the device to an additional device configured according to claim 1 and/or to the one or more other processing station, the one or more transporting paths configured to move the exchangeable container between the device and the additional device, between the device and the one or more other processing station, and/or between the additional device and the one or more other processing station.

12. The system of claim 11, wherein the one or more transporting paths comprises a plurality of branches provided therein, and wherein movement of the exchangeable container is controlled at a respective one of the plurality of branches by the manufacturing data of the memory chip.

13. The system of claim 1, wherein the exchangeable container comprises a servomotor or a drive motor, the servomotor or the drive motor configured to be controlled by the manufacturing data on the memory chip.

14. The system of claim 13, wherein the exchangeable container comprises a height-adjustable building platform, and the servomotor or the drive motor is configured to control the height adjustment of the building platform.

15. The system of claim 1, wherein the exchangeable container comprises a heating device, wherein the heating device is configured to be controlled by the manufacturing data of the memory chip.

16. An exchangeable container for use with a device for additive manufacturing of three-dimensional objects, the device comprising a process chamber defined by at least one housing, and the exchangeable container comprising a memory chip that can be read by an electronic reading device, the memory chip comprising manufacturing data configured to automatically control, based at least in part on an object built or to be built using the device:

operation of one or more active elements of the exchangeable container; and/or operation of one or more transporting paths, the one or more transporting paths configured to move the exchangeable container into or out of the process chamber and/or to or from one or more other processing stations and/or to or from one or more storage positions;

wherein the memory chip is integrated within the exchangeable container or detachably or undetachably fastened to the exchangeable container, and/or disposed within a portion of unsolidified building material within the exchangeable container, and/or connected to or integrated within a building plate disposed within the exchangeable container.

17. The exchangeable container of claim 16, wherein the one or more active elements of the exchangeable container comprise a drive motor, a heating element, a cooling element, a ventilating motors, and/or a suction extraction equipment.

18. A method of additively manufacturing an object, the method comprising:

moving an exchangeable container along at least one of one or more transporting paths into a process chamber of a device for additively manufacturing three-dimensional objects;

additively manufacturing an object using the device;

moving the exchangeable container along at least one of the one or more transporting paths out of the process chamber and to another processing station and/or to a storage position; and controlling automatically using manufacturing data on a memory chip, operation of one or more active elements of the exchangeable container based at least in part on the object built or to be built using the device and/or operation of at least one of the one or more transporting paths based at least in part on the object built or to be built using the device;

wherein the operation of the one or more active elements and/or the operation of the one or more transporting paths are controlled in connection with additively manufacturing the object and/or moving the exchangeable container along at least one of the one or more transporting paths; and wherein the memory chip is integrated within the exchangeable container or detachably or undetachably fastened to the exchangeable container, and/or disposed within a portion of unsolidified building material within the exchangeable container, and/or connected to or integrated within a building plate disposed within the exchangeable container.

19. The method of claim 18, wherein the one or more active elements of the exchangeable container comprise a drive motor, a heating element, a cooling element, a ventilating motors, and/or a suction extraction equipment.

* * * * *